(12) United States Patent
Kawai et al.

(10) Patent No.: US 7,360,953 B2
(45) Date of Patent: Apr. 22, 2008

(54) LIGHT GUIDING DEVICE

(75) Inventors: Kazuhito Kawai, Hamamatsu (JP); Tetsuya Osajima, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 208 days.

(21) Appl. No.: 10/522,180

(22) PCT Filed: Jul. 4, 2003

(86) PCT No.: PCT/JP03/08560

§ 371 (c)(1),
(2), (4) Date: Oct. 26, 2005

(87) PCT Pub. No.: WO2004/012244

PCT Pub. Date: Feb. 5, 2004

(65) Prior Publication Data

US 2006/0099754 A1    May 11, 2006

(30) Foreign Application Priority Data

Jul. 25, 2002    (JP) .............................. 2002-217184

(51) Int. Cl.
G02B 6/26    (2006.01)
G02B 6/36    (2006.01)

(52) U.S. Cl. ............................ 385/77; 385/15; 385/79; 385/84; 385/115

(58) Field of Classification Search ............. 385/76–87
See application file for complete search history.

(56) References Cited

U.S. PATENT DOCUMENTS

| 4,964,692 | A | * | 10/1990 | Prescott ...................... 385/117 |
| 5,229,811 | A | | 7/1993 | Hattori et al. |
| 6,523,985 | B2 | * | 2/2003 | Hamanaka et al. ......... 362/554 |

FOREIGN PATENT DOCUMENTS

| EP | 0 141 369 | 5/1985 |
| EP | 0 788 032 | 8/1997 |
| EP | 0 920 053 | 6/1999 |
| JP | 07-192993 | 7/1995 |
| JP | 10-074676 | 3/1998 |
| JP | 10-233354 | 9/1998 |

\* cited by examiner

*Primary Examiner*—Michelle Connelly-Cushwa
(74) *Attorney, Agent, or Firm*—Drinker Biddle & Reath LLP

(57) ABSTRACT

A light emitting end face side front end part of an optical fiber bundle 16 is covered by a sleeve member 13 and an emitting part outer cover 14. A glass rod holding member 42, which holds a glass rod 40, is mounted to emitting part outer cover 14. Glass rod 40 is fixed to glass rod holding member 42 by means of positioning pins 44 and a light incidence end face 40$i$ thereof opposes a light emitting end face 16$o$ of optical fiber bundle 16. A light emitting end face 40$o$ of glass rod 40 has a rectangular shape. The light emitting from light emitting end face 40$o$ is made uniform in illuminance across the entirety of its cross section and the cross section thereof is shaped to a rectangular shape in the process of being propagated while being totally reflected at the boundary surface of glass rod 40.

8 Claims, 7 Drawing Sheets

LIGHT GUIDING DEVICE

TECHNICAL FIELD

The present invention concerns a light guiding device that is used to perform exposure for removal of unnecessary resist on peripheral parts of a semiconductor wafer.

BACKGROUND ART

In pattern forming processes using photolithography that are performed on semiconductor wafers, there are cases where peripheral parts of a pattern formation part are not exposed and resist remains at such peripheral parts. Since resist remaining at a peripheral part can peel off and become dust that adheres to the semiconductor wafer, it must be removed prior to entering a subsequent process. For removal of the unnecessary resist on peripheral parts of a semiconductor wafer, a method, wherein light, guided by a light guiding device, is illuminated onto a resist-removal portion and the illumination spot is moved across the resist-removal portion to expose the entire resist-removal portion, is used. With this exposure method, in order to expose the entirety of the resist-removal portion uniformly, it is required that the light emitting from the light guiding device be shaped to have a cross section of rectangular shape and that the illuminance be made uniform across the entire cross section of the emitting light.

As a prior art of such a light guiding device, there is, for example, the light guiding device disclosed in Japanese Patent Publication Laid-open (Tokukai) No. H10-74676. With the light guiding device of Japanese Patent Publication Laid-open (Tokukai) No. H10-74676, an aperture member, having a rectangular transmitting part and being installed on an illumination head, shapes the cross section of the light emitting from the light guiding device to a rectangular shape. Also, U.S. Pat. No. 4,964,692 discloses a light guiding device equipped with stem-like member with a core/clad structure (a clad cane element), which makes uniform the light emitting from a light emitting end face of an optical fiber bundle.

DISCLOSURE OF THE INVENTION

However, with the prior-art light guiding devices, since a light blocking part of an aperture member blocks the outer rim of the light emitting from a light guiding fiber, the light amount of the emitting light is decreased.

The present invention has been made to resolve the above issue, and an object thereof is to provide a light guiding device, which shapes the cross section of light, emitting from a light guide fiber, to a rectangular shape and makes uniform the illuminance across the entire cross section of the emitting light without decreasing the light amount of the emitting light.

In order to achieve the above object, this invention provides in a light guiding device used for exposure of peripheral parts of a semiconductor wafer, a light guiding device, comprising: an optical fiber bundle, formed by bundling together a plurality of optical fibers and having a first light incidence end face and a first light emitting end face; a glass rod, having a second light incidence end face and a second light emitting end face and making uniform the cross section of light emitting from the second light emitting end face by taking in, from the second light incidence end face, the light emitting from the first light emitting end face of the optical fiber bundle and guiding this light to the second light emitting end face; and a glass rod holding member, which fixes the glass rod to a light emitting end face side front end part of the optical fiber bundle so that the second light incidence end face of the glass rod opposes the first light emitting end face of the optical fiber bundle; the second light emitting end face of the glass rod having a rectangular shape.

The glass rod takes in the light emitting from the optical fiber bundle and makes the illuminance uniform across the entire cross section of the emitting light. Also, since the second light emitting end face of the glass rod has a rectangular shape, the emitting light from the glass rod is shaped to be rectangular in cross section. The light thus does not have to be shaped by applying an aperture member and blocking the outer rim of the cross section of the emitting light. Consequently, the light that is guided by the optical fiber bundle can be illuminated onto peripheral parts of a semiconductor wafer without decrease of the light amount.

Also, with this invention's light guiding device, the glass rod preferably satisfies the relationships expressed by the following formulae (1) and (2).

$$L > \frac{d}{2} \frac{1}{\tan\theta'} \quad (1)$$

$$n\sin\theta = n'\sin\theta' \quad (2)$$

L[mm]: length of the glass rod
d[mm]: length of the diagonal of the second light emitting end face of the glass rod
n: refractive index of air
n': refractive index of the glass rod
θ: maximum angle of emit from the optical fiber into air
θ': angle of refraction of light, which has emited from the optical fiber at the maximum emit angle, upon incidence onto the second light incidence end face When the glass rod meets the above conditions, the maximum emit angle component, among the emitting light from the optical fiber that enters the glass rod via the central axis, is totally reflected at least once at the boundary surface (interface between the glass rod and a clad or ambient air) of the glass rod. Thus by the total reflection and mixing of the light emitting from the respective optical fibers at the boundary surface of the glass rod, the non-uniformity of illuminance at the first light emitting end face of the optical fiber bundle is made uniform satisfactorily.

Also, with this invention's light guiding device, it is preferable for a sleeve member, which covers the light emitting end face side front end part of the optical fiber bundle, to be equipped and for the glass rod holding member to be detachably mounted to the sleeve member.

Since the glass rod holding member can then be removed from the sleeve member, exchange and washing of the glass rod are facilitated.

Also, with this invention's light guiding device, it is preferable for the plurality of optical fibers to be adhered to each other by an adhesive agent at the light emitting end face side front end part of the optical fiber bundle.

By the optical fibers being adhered by an adhesive agent at the light emitting end face side front end part of the optical fiber bundle, the shape of the light emitting end face side front end part can be maintained regardless of the shape of the optical fiber bundle. Also, the density of the core end faces at the first light emitting end face of the optical fiber bundle is made high and dark parts (parts besides the core end faces) are lessened. The light amount density at the first light emitting end face is thereby increased.

Also with this invention's light guiding device, it is preferable for the first light emitting end face of the optical fiber bundle to oppose the second light incidence end face of the glass rod across a gap.

By there being a gap between the second light incidence end face of the glass rod and the first light emitting end face of the optical fiber bundle, damaging of the second light incidence end face and the first light emitting end face due to contact with each other can be prevented.

Also this invention's light guiding device is preferably equipped with a sleeve member, covering the light emitting end face side front end part of the optical fiber bundle, and a curving part holding member, which, by being fixed to the vicinity of the light emitting end face side front end part of the optical fiber bundle and to the sleeve member, maintains a state wherein the optical fiber bundle is curved in the vicinity of the front end part.

Since the state in which the optical fiber bundle is curved in the vicinity of the light emitting end face side front end part is held by the curving part holding member of the above structure, the space occupied by the optical fiber bundle in the vicinity of the light emitting end face side front end part can be made small.

BEST MODE FOR CARRYING OUT THE INVENTION

A preferable embodiment of this invention's light guiding device shall now be described with reference to the attached drawings. In the respective drawings, the same elements shall be provided with the same symbols and redundant description shall be omitted.

Figure 1:
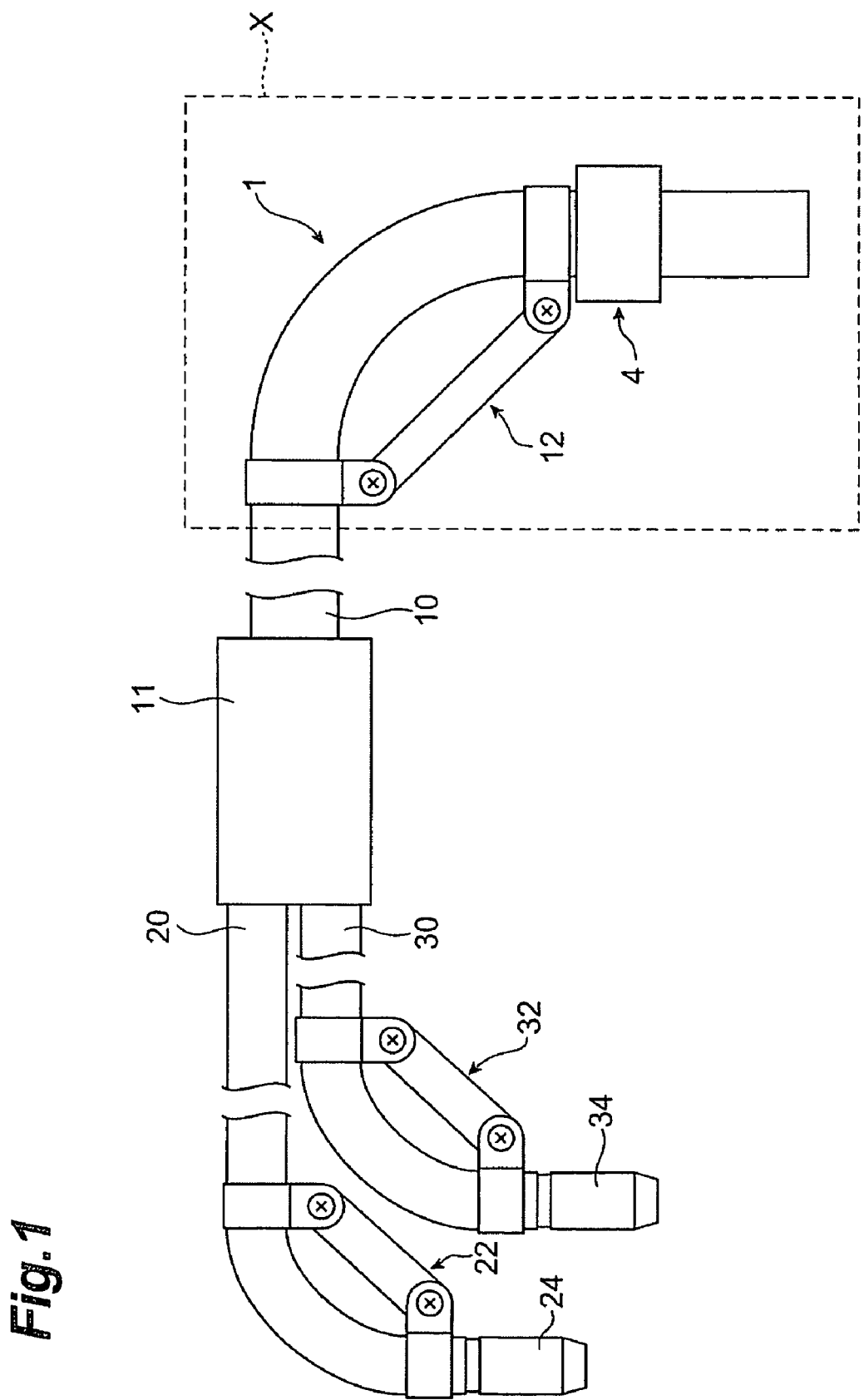
FIG. 1 is a diagram showing the outer appearance of a light guiding device 1.
Figure 2:
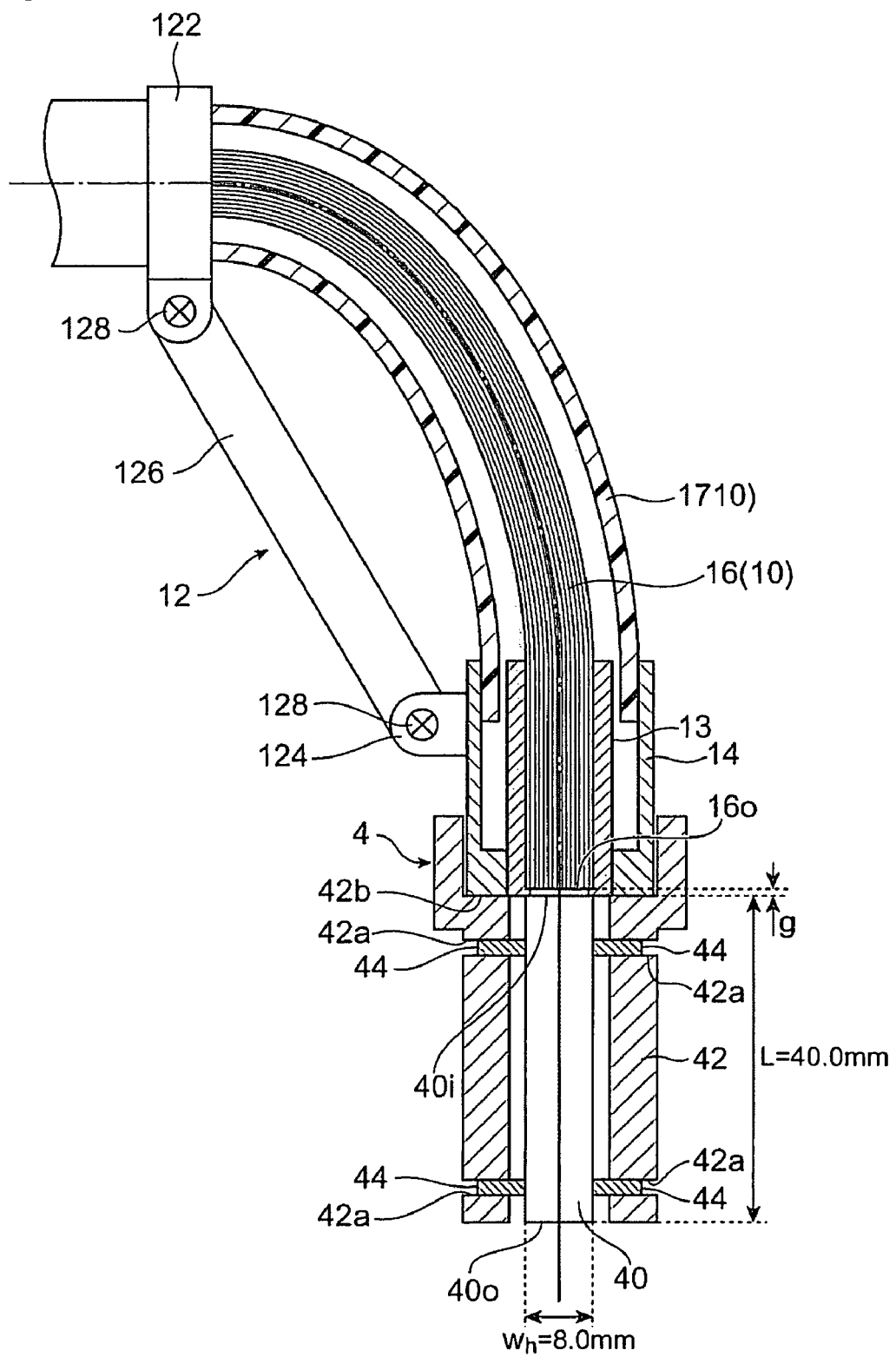
FIG. 2 is a partial sectional view showing a region X in FIG. 1 of light guiding device 1 in enlarged manner.

First, the structure of this embodiment's light guiding device 1 shall be described. FIG. 1 is a diagram showing the outer appearance of light guiding device 1. FIG. 2 is a partial sectional view showing a region X in FIG. 1 of light guiding device 1 in enlarged manner. Light guiding device 1 is equipped, at a light emitting end face side, with a light guide cable 10, which is arranged by an optical fiber bundle 16, formed by bundling together a plurality of optical fiber cores (UV transmitting quartz fiber cores), being covered by a PVC cladding 17. The light guide cable 10 is branched at a light incidence end face side into a light guide cable 20 and light guide cable 30. Light guide cable 20 and light guide cable 30 are substantially equal in the number of cores, and by bundling together the optical fiber cores that make up these cables at the branching part, optical fiber bundle 16 of light guide cable 10 is formed. The branching part of this optical fiber cable is covered by a branching part outer cover 11.

Figure 3:
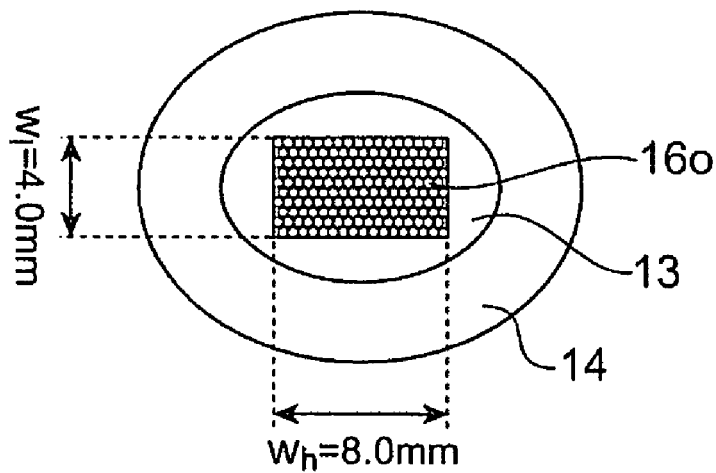
FIG. 3 is a diagram showing a light emitting end face of a light guide cable 10.
Figure 6:
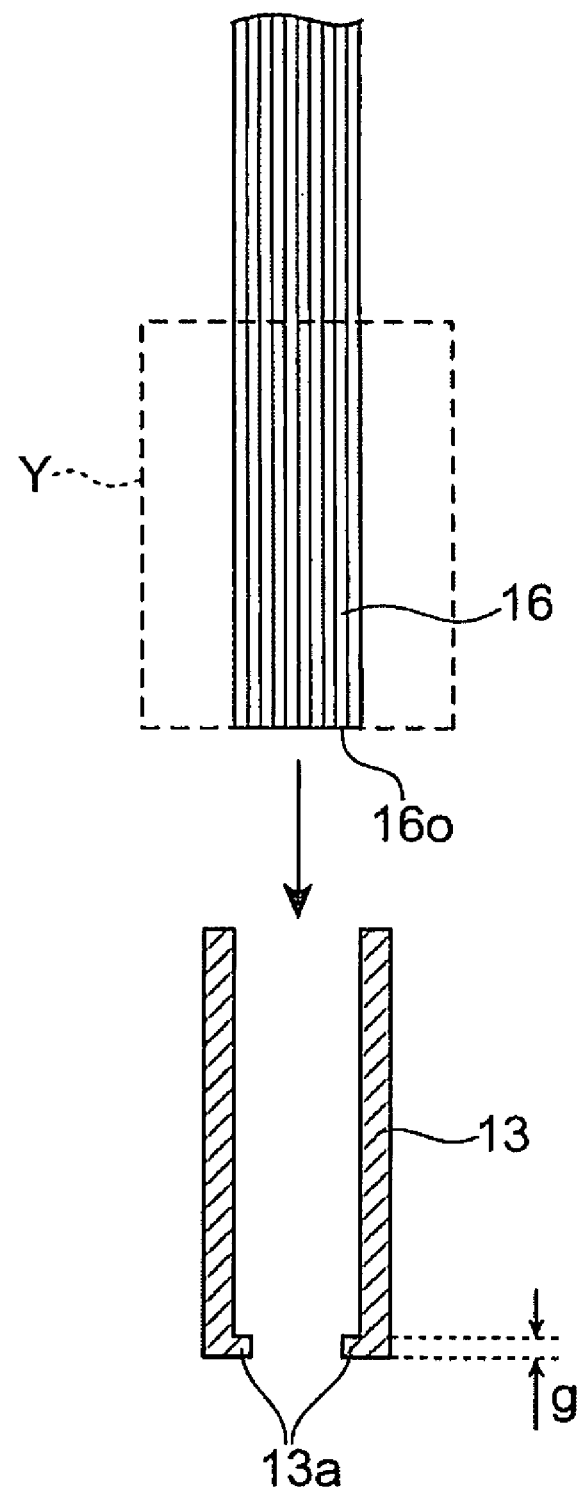
FIG. 6 is a diagram showing the manner in which a light emitting end face side front end part of an optical fiber bundle 16 is fitted into a sleeve member 13.

A light emitting end face side front end part of optical fiber bundle 16 is fitted into a sleeve member 13 upon adhesion of the optical fiber cores to each other by an adhesive agent in a manner such that the cross section is made rectangular in shape. The structure of the light emitting end face side front end part of optical fiber bundle 16 shall now be described in more detail. FIG. 3 is a diagram showing the light emitting end face of light guide cable 10. FIG. 6 is a diagram showing the manner in which the light emitting end face side front end part of optical fiber bundle 16 is fitted into sleeve member 13. Optical fiber bundle 16 is fixed in shape at the light emitting end face side front end part (part corresponding to a region Y shown in FIG. 6) by the optical fiber cores being adhered to each other by the adhesive agent. By this process, the cross-sectional shape of the light emitting end face side front end part is formed to a rectangular shape, which is 8.0 mm in the lateral direction and 4.0 mm in the longitudinal direction, as shown in FIG. 3. Also, the alignment of the optical fiber cores at the light emitting end face side front end part is preferably as random as possible with respect to the alignment of the optical fiber cores at the other parts. The making of the alignment of the optical fiber cores at the light emitting end face side front end part random contributes to the making uniform of the scattering of the light amounts of the light emitting from the respective optical fiber cores.

As shown in FIG. 3 and FIG. 6, sleeve member 13 is a cylindrical member, the overall shape of which is an elliptical column. The hollow part of sleeve member 13 has a rectangular cross section, which is 8.0 mm in the lateral direction and 4.0 mm in the longitudinal direction, and at the opening at one side, a step 13a is formed by the slight protruding of a side wall. The thickness of step 13a is adjusted to be of a predetermined length g. Optical fiber bundle 16, the light emitting end face side front end part of which is fixed by the adhesive agent, is inserted into the hollow part and thereby fitted into sleeve member 13. Upon fitting, step 13a latches onto a light emit end face 16o of optical fiber bundle 16 and a gap of interval g is formed between the bottom face of sleeve member 13 and light emitting end face 16o. By optical fiber bundle 16 thus being fitted into sleeve member 13, the shape of the light emitting end face side front end part is maintained regardless of variations of the shape of optical fiber bundle 16. Furthermore, by the light emitting end face side front end part being fixed by the adhesive agent, the shape is fixed even more strongly, the density of core end faces at light emitting end face 16o is made high, and dark parts (parts besides the core end faces) are lessened. The light amount density at light emitting end face 16o is thus made high.

Sleeve member 13 is a cylindrical member, the overall shape of which is an elliptical column, and an emitting part outer cover 14, having a hollow part of elliptical columnar shape, is mounted so that the bottom face of sleeve member 13 and the bottom face of emitting part outer cover 14 are positioned on the same plane. The light emitting end face side front end part of optical fiber bundle 16 is covered by emitting part outer cover 14 and PVC cladding 17.

Figure 4:
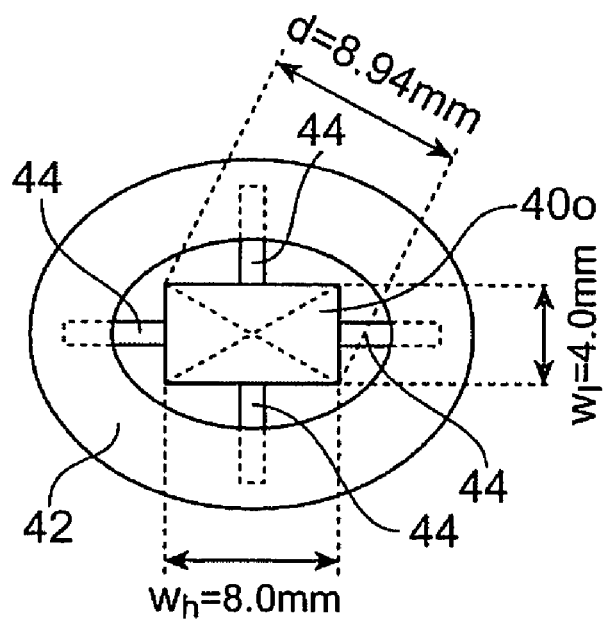
FIG. 4 is a diagram showing a light emitting end face of an illumination head 4.

As shown in FIG. 2, an illumination head 4 is detachably mounted to the light emitting end face side front end part of optical fiber bundle 16. Illumination head 4 comprises a glass rod holding member 42, a glass rod 40, which is housed in glass rod holding member 42, and a positioning pin 44, which fixes glass rod 40, and glass rod 40 is set to oppose light emit end face 16o of optical fiber bundle 16. The structure of illumination head 4 and glass rod 40 shall now be described in detail. FIG. 4 is a diagram showing a light emitting end face of illumination head 4. Glass rod 40 has basal faces with a rectangular shape that is 8.0 mm in the lateral direction and 4.0 in the longitudinal direction and has a quadratic prism shape with a length (height) of 40.0 mm. The basal face at one side of glass rod 40 becomes a light incidence end face 40i and the other basal face becomes a light emitting end face 40o.

As shown in FIG. 2 and FIG. 4, glass rod holding member 42 has a cylindrical shape and the inner periphery and outer periphery of the cross section at the front end part (glass rod housing part) are both elliptical in shape. Though the inner periphery and outer periphery of the cross section at the terminal end part (emitting part outer cover mounting part) are also elliptical, the inner peripheral diameters of the emitting part outer cover mounting part are greater than the inner peripheral diameters of the glass rod housing part.

At the glass rod housing part, the major diameter of the inner periphery of the cross section is set to be longer than 8.0 mm (the length of the lateral side of light emitting end face 40o of glass rod 40) and the minor diameter is set to be longer than 4.0 mm (the length of the longitudinal side of light emitting end face 40o of glass rod 40). Also, the length of the hollow part is set to 40.0 mm (the length of glass rod 40). At the side wall of the glass rod housing part, four positioning pin insertion holes 42a are formed at each of the front end part side and the terminal end part side. Glass rod 40 is housed with a degree of freedom when it is inserted into the glass rod housing part and the position of glass rod 40 is fixed by positioning pins 44 that are inserted into positioning pin insertion holes 42a. Threaded grooves may be formed at the side faces of positioning pin insertion holes 42a and positioning screws may be screwed into positioning pin insertion holes 42a in place of positioning pins 44.

The shape and size of the inner periphery of the cross section at the emitting part outer cover mounting part are the same as those of the outer periphery of emitting part outer cover 14, and emitting part outer cover 14 is set to be fitted in the hollow part of the emitting part outer cover mounting part. By the fitting of emitting part outer cover 14 in the hollow part of the emitting part outer cover mounting part, illumination head 4 is mounted detachably to emitting part outer cover 14. Illumination head 4 is thus detachably mounted via illumination part outer cover 14 to sleeve member 13. Since illumination head 4 is thus made detachable, exchange and washing of glass rod 40 are facilitated.

Since the inner peripheral diameters of the emitting part outer cover mounting part are greater than the inner peripheral diameters of the glass rod housing part, a step 42b is formed at the boundary part of these parts. When emitting part outer cover 14 is fitted in the hollow part of the emitting part outer cover mounting part, this step 42b latches onto the bottom face of emitting part outer cover 14. Meanwhile, when glass rod 40 is inserted into the glass rod housing part, glass rod 40 is fixed so that light incidence end face 40i is positioned on the same plane as step 42b (the bottom faces of emitting part outer cover 14 and sleeve member 13). Since as mentioned above, there is a gap of interval g between the bottom face of sleeve member 13 and light emitting end face 16o of optical fiber bundle 16, a gap of interval g is formed between light incidence end face 40i of glass rod 40 and light emitting end face 16o of optical fiber bundle 16. By there being a gap between light incidence-end face 40i and light emitting end face 16o, damaging of light incidence end face 40i and light emitting end face 16o can be prevented.

As described above, when illumination head 4 is mounted to the front end part of light guide cable 10, glass rod 40 is fixed so as to oppose light emitting end face 16o of optical fiber bundle 16 across a gap of interval g. Furthermore, by shifting the positions of positioning pins 44, the orientation of glass rod 40 is adjusted so that light incidence end face 40i can pick up the emitting light from light emitting end face 16o without leakage.

As shown in FIG. 1 and FIG. 2, light guide cable 10 is curved at a right angle near the front end part and this shape is held by a curving part holding member 12. Curving member holding part 12 is equipped and arranged with a ring 122, a ring 124, a fixing plate 126, and screws 128. Ring 122 is fixed at a location near the front end part of light guide cable 10. Ring 124 is fixed onto the outer peripheral surface of emitting part outer cover 14. That is, ring 124 is fixed to sleeve member 13 via emitting part outer cover 14. The respective end parts of fixing plate 126 are mounted to ring 122 and ring 124 and, after being fastened by screws 128, are fixed by an epoxy adhesive agent. Since due to the application of curving part holding member 12 with such an arrangement, a force acts so as to draw sleeve member 13 and a portion at the vicinity of the front end part of light guide cable 10 towards each other, the curved state of the vicinity of the front end part of light guide cable 10 is maintained. At the curved part, the optical fiber cores of optical fiber bundle 16 are twisted together to provide a bend-resistant structure. For example, approximately 200 optical fiber cores are twisted together to form a sub-bundle and seven such sub-bundles are twisted together to form the optical fiber bundle. Since light guide cable 10 is thus curved at a right angle near its front end part and this shape is held by curving part holding member 12, good maintenance of the vertical illumination state of the emitting light, prevention of damage of optical fiber bundle 16 due to repeated curving, and prevention of damage due to the contacting of the front end part of light guide cable 10 with inner peripheral parts of the exposure device resulting from the front end part being in a floating state in the process of mounting the device are enabled.

Figure 5:
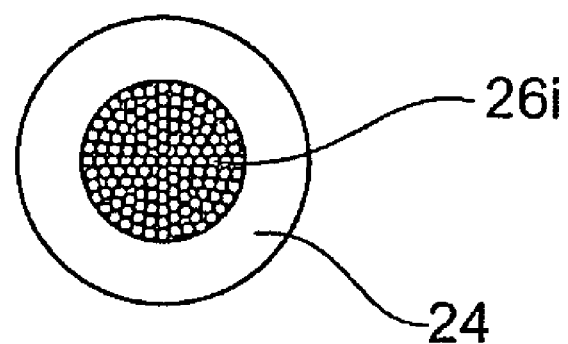
FIG. 5 is a diagram showing the end face of a first light incidence part.

At the incidence part side of light guiding device 1, the front end part of light guide cable 20, which forms a first light incidence part, is covered by an incidence part outer cover 24. FIG. 5 is a diagram showing the end face of the first light incidence part. As shown in FIG. 5, the front end face (light incidence end face 26i) of the optical fiber bundle that makes up light guide cable 20 is exposed from incidence part outer cover 24. Light incidence end face 26i has a circular shape. Light guide cable 20 is curved near the front end part and this curved state is maintained by a curving part holding member 22. As with light guide cable 20, light guide cable 30 is equipped with a second light incidence part at its front end part and is maintained in a curved state by a curving part holding member 32. A light source is connected to the first light incidence part and light for exposing peripheral parts of a semiconductor wafer is taken into the optical fiber bundle from light incidence end face 26i of the first light incidence part. If an even greater amount of light is required, another light source is connected to the second light incidence part as well.

The actions and effects of light guiding device 1 shall now be described. Light from the light source is optically guided by the optical fiber bundle and emits from light emit end face 16o. The emitting light from light emitting end face 16o is made incident on light incidence end face 40i of glass rod 40. The light that is made incident on light incidence end face 40i propagates through glass rod 40 and emits from light emitting end face 40o, and in this process, the illuminance of the cross section of the emitting light is made uniform and the cross-sectional shape of the emitting light is shaped.

Figure 7:
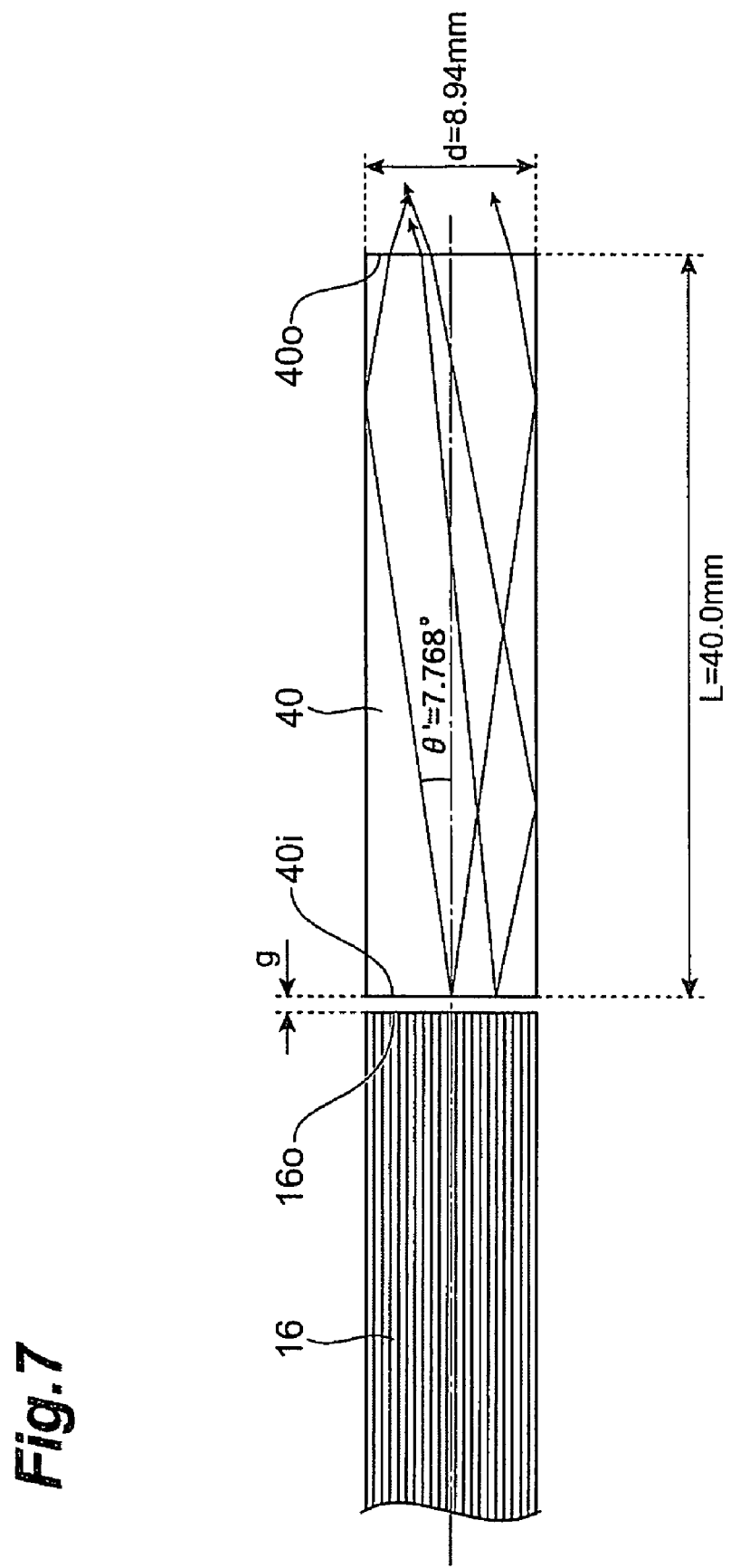
FIG. 7 is a diagram, showing the manner in which light is totally reflected and propagated in a cross section along the length direction (cross section containing the diagonal of a light emitting end face 40o) of a glass rod 40.

The process by which the illuminance of the cross section of the emitting light is made uniform and the cross-sectional shape of the emitting light is shaped at glass rod 40 shall now be described in detail. FIG. 7 is a diagram, showing the manner in which light is totally reflected and propagated in the cross section along the length direction (the cross section containing the diagonal of light emitting end face 40o) of glass rod 40. The length d of this diagonal is 8.94 mm as expressed by formula (3)

$$d=\sqrt{W_h^2 \times W_1^2} \approx 8.94 \qquad (3)$$

$W_h$: length of lateral side of light emitting end face 40o=8.0 mm
$W_1$: length of longitudinal side of light emitting end face 40o=4.0 mm With the present embodiment, the maximum emit angle θ (maximum angle formed by the optical axis of the optical fiber cores and the emitting light) into air of the optical fiber cores that make up optical fiber bundle 16 is 11.5°. When light of such a maximum angle component is made incident into glass rod 40 from light incidence end face 40i, the angle θ' formed by the light of the maximum angle component and the optical axis (the central axis of glass rod 40) will be 7.768° as expressed by formula (4), derived from formula (2):

$$n\sin\theta = n'\sin\theta' \qquad (2)$$

$$\theta' = \sin^{-1}\left(\frac{n}{n'}\sin\theta\right) \approx 7.768 \qquad (4)$$

n: refractive index of air=1
n': refractive index of glass rod 40=1.475

Here, the condition of the length of glass rod 40, for making the abovementioned light of the maximum angle component (presumed to be made incident into glass rod 4 along the central axis) be totally reflected at least once at the interface between glass rod 40 and air, is expressed by formula (1).

$$L > \frac{d}{2}\frac{1}{\tan\theta'} \qquad (1)$$

L[mm]: length of the glass rod 40

The length of glass rod 40 of the present embodiment is 40.0 mm and satisfies the above condition. Since the emitting light from the respective optical fiber cores thus become totally reflected at the boundary of glass rod 40 and air and thereby become mixed, the non-uniformity of the illuminance at light emit end face 16o of optical fiber bundle 16 is made uniform. That is, non-uniformity of illuminance occurs at light emitting end face 16o due to such causes as the bend loss of guided light differing according to each optical fiber core, there being a clad region, in which light is not propagated, on light emitting end face 16o, etc. However, by applying glass rod 40 of the present embodiment and mixing the emitting light from the respective optical fiber cores, the non-uniformity of illuminance can be made uniform.

Also, since light emitting end face 40o of glass rod 40 is rectangular, the cross section of the light emitting from light emitting end face 40o is shaped to a rectangular shape. There is thus no need to apply an aperture member to block the outer rim of the cross section of the emitting light to shape the light. Consequently, the light guided by the optical fiber bundle can be illuminated onto peripheral parts of a semiconductor wafer without decrease of the light amount. The shapes of the light emitting end face of the optical fiber bundle and the light incidence end face of the glass rod do not have to be rectangular. Even if these are not rectangular, as long as the light emitting end face of the glass rod is rectangular, the cross section of the light that emits from the light emitting end face of the glass rod will be shaped to a rectangular shape.

Figure 8:
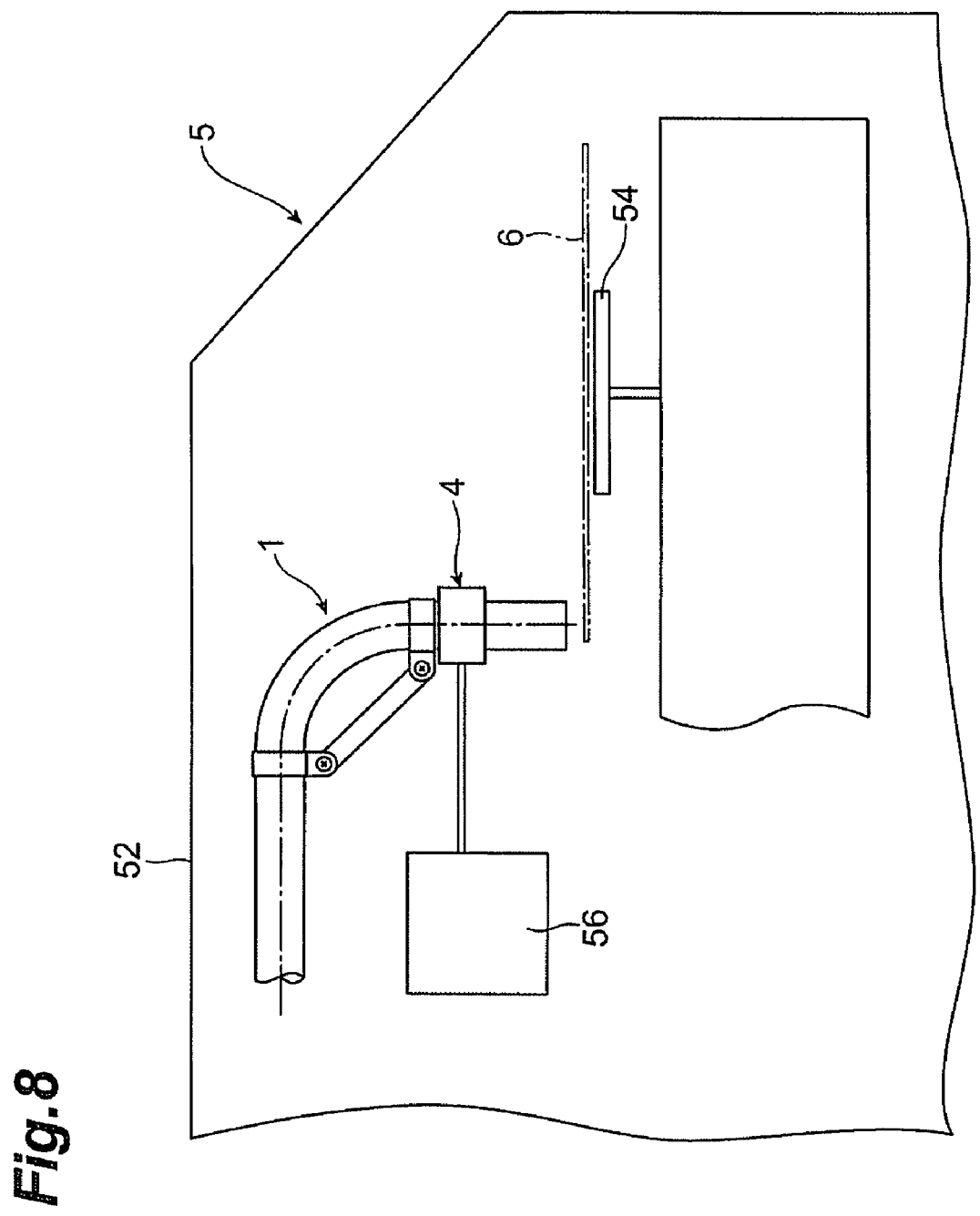
FIG. 8 is a schematic diagram of a semiconductor wafer periphery exposure device 5 to which light guiding device 1 is applied.

FIG. 8 is a schematic diagram of a semiconductor wafer periphery exposure device 5 to which light guiding device 1 is applied. Semiconductor wafer periphery exposure device 5 is equipped with a casing 52, and peripheral parts (resist-removal portions) of a semiconductor wafer 6 are exposed to light inside casing 52. Semiconductor wafer 6 is set on a rotating supporting plate 54. An illumination head moving device 56 supports illumination head 4 and controls the position of illumination head 4. Illumination head 4 illuminates a single point of a peripheral part (resist-removal portion) of semiconductor wafer 6, and by the rotation of semiconductor wafer 6 by rotating supporting plate 54 and the movement of the illumination spot of illumination head 4 by illumination head moving device 56, peripheral parts (resist-removal portions) of semiconductor wafer 6 are exposed evenly.

Though the optical axis of light guide cable 10 is directed in the vertical direction at the front end part at the light emitting end face side, since the optical axis of light guide cable 10 is curved near this front end part so as to be directed in the horizontal direction, casing 52 can be made compact in size in the vertical direction. Also, the housing space at the housing position to which illumination head 4 is moved can be made small.

As described above, with this invention, a light guiding device, which shapes the cross section of light, emitting from a light guide fiber, to a rectangular shape and makes uniform the illuminance across the entire cross section of the emitting light without decreasing the light amount of the emitting light, can be provided.

INDUSTRIAL APPLICABILITY

The present invention can be applied, for example, to the manufacture of a semiconductor integrated circuit.

The invention claimed is:

1. A light guiding device used for exposure of peripheral parts of a semiconductor wafer, comprising:
an optical fiber bundle, formed by bundling together a plurality of optical fibers and having a first light incidence end face and a first light emitting end face;
a glass rod, having a second light incidence end face and a second light emitting end face and making uniform the cross section of light emitting from said second light emitting end face by taking in, at said second light incidence end face, the light having emitted from said first light emitting end face of the optical fiber bundle and guiding this light to said second light emitting end face; and a glass rod holding member, which fixes said glass rod to a light emitting end face side front end part of said optical fiber bundle so that said second light incidence end face of the glass rod faces said first light emitting end face of the optical fiber bundle, said second light emitting end face of the glass rod having a rectangular shape, wherein said glass rod satisfies the relationships expressed by the following formulae (1) and (2):

$$L > \frac{d}{2} \frac{1}{\tan\theta'} \quad (1)$$

$$n\sin\theta = n'\sin\theta' \quad (2)$$

where:
L[mm]: length of said glass rod
d[mm]: length of the diagonal of said second light emitting end face of the glass rod
n: refractive index of air
n': refractive index of said glass rod
θ: maximum emit angle from said optical fiber into air
θ': angle of refraction of light, which has emitted from said optical fiber at the maximum emit angle, upon incidence onto said second light incidence end face.

2. The light guiding device according to claim 1, comprising a sleeve member, which covers the light emitting end face side front end part of said optical fiber bundle, and wherein said glass rod holding member is detachably mounted to said sleeve member.

3. The light guiding device according to claim 1, wherein said plurality of optical fibers adheres to each other by an adhesive agent at the light emitting end face side front end part of said optical fiber bundle.

4. The light guiding device according to claim 1, wherein said first light emitting end face of the said optical fiber bundle faces said second light incidence end face of the glass rod via a gap.

5. A light guiding device used for exposure of peripheral parts of a semiconductor wafer, comprising:

an optical fiber bundle, formed by bundling together a plurality of optical fibers and having a first light incidence end face and a first light emitting end face;

a glass rod, having a second light incidence end face and a second light emitting end face and making uniform the cross section of light emitting from said second light emitting end face by taking in, at said second light incidence end face, the light having emitted from said first light emitting end face of the optical fiber bundle and guiding this light to said second light emitting end face; and a glass rod holding member, which fixes said glass rod to a light emitting end face side front end part of said optical fiber bundle so that said second light incidence end face of the glass rod faces said first light emitting end face of the optical fiber bundle, said second light emitting end face of the glass rod having a rectangular shape; and a sleeve member, covering the light emitting end face side front end part of said optical fiber bundle; and a curving part holding member, which, by being fixed to a portion of said optical fiber bundle in the vicinity of the light emitting end face side front end part and to said sleeve member, maintains a state wherein said optical fiber bundle is curved in the vicinity of said front end part.

6. The light guiding device according to claim 5, comprising a sleeve member, which covers the light emitting end face side front end part of said optical fiber bundle, and wherein said glass rod holding member is detachably mounted to said sleeve member.

7. The light guiding device according to claim 5, wherein said plurality of optical fibers adheres to each other by an adhesive agent at the light emitting end face side front end part of said optical fiber bundle.

8. The light guiding device according to claim 5, wherein said first light emitting end face of the said optical fiber bundle faces said second light incidence end face of the glass rod via a gap.

* * * * *